Aug. 30, 1949.  W. G. MARTIN  2,480,376
WELDED TANK CONSTRUCTION
Filed Dec. 11, 1944

Wesley G. Martin
INVENTOR.

BY
ATTORNEY.

Patented Aug. 30, 1949

2,480,376

UNITED STATES PATENT OFFICE 2,480,376

WELDED TANK CONSTRUCTION

Wesley G. Martin, Milwaukee, Wis., assignor to A. O. Smith Corporation, Milwaukee, Wis., a corporation of New York Application December 11, 1944, Serial No. 567,741

5 Claims. (Cl. 220—67)

This invention relates to welded tank constructions and has been applied in the construction of domestic hot water heater storage tanks having a non-metallic corrosion resisting lining of substantial thickness, such as ceramic enamel.

The construction of ceramic enamel-lined tanks requires that the heads and shell be separately lined prior to assembly and welding, and generally involves a substantial overlapping of the enamel linings of the heads and shell adjacent the weld as set forth in United States Letters Patent No. 2,263,021 to Otto Uecker for Domestic hot water tank.

Such tanks have been constructed by arc welding, and a tight seal between the overlapping linings was obtained prior to the welding operation as by tapering and fitting the parts together on the taper, in order to have the seal effective to protect the weld from corrosion on the inside in service.

The principal object of the present invention is to provide an electric resistance line welded construction for the tank.

Another object of the invention is to facilitate the obtaining of a tight fit of the parts by increasing the engagement pressure thereof during the welding operation.

Another object is to compensate for the thickness of the non-metallic intermediate parts when resistance-welding the head flange and shell of a tank together.

Another object is to provide for seam welding the head flange and shell together without injuring the overlapping lining of the parts adjacent the weld.

In carrying out the invention the outer edge portion of one or both members to be seam welded together is offset toward the opposite member, the total amount of offset for the members being slightly less than the total thickness of the intermediate parts, including the overlapping linings and an intermediate gasket.

An embodiment of the invention is illustrated in the accompanying drawing in which.

Figure 1:
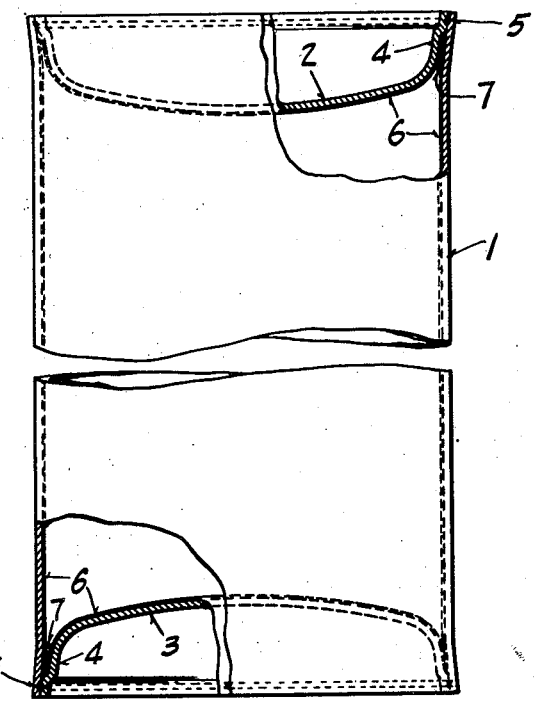
Figure 1 is a side elevation of a tank with parts broken away and sectioned.
Figure 2:
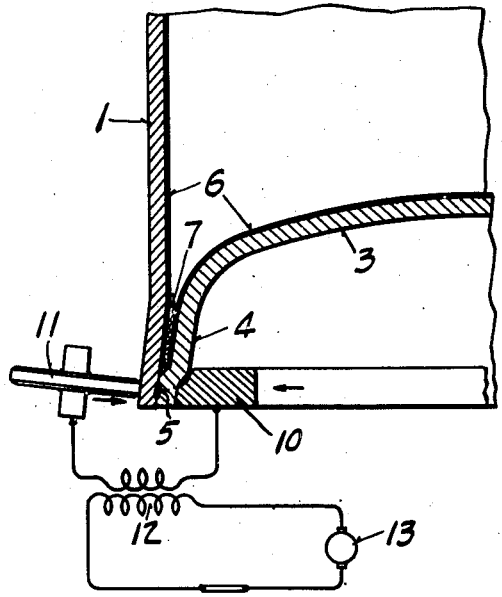
Fig. 2 is an enlarged section through the welded joint shown in Fig. 1 and showing the welding operation.

The tank comprises a cylindrical shell 1 and end heads 2 and 3 which have outwardly directed peripheral flanges 4 fitting within the ends of the shell and electric resistance seam welded thereto as at 5.

The shell and heads are lined with ceramic enamel 6 or other suitable lining and the lining on the flanges 4 overlaps the lining at the corresponding ends of shell 1. A suitable gasket 7, of asbestos paper or the like, may be provided between the linings 6 of the overlapping parts to prevent injury thereto during assembly and more adequately seal the two linings together adjacent the weld.

Both the shell 1 and the flange 4 extend outwardly beyond the edges of the lining 6 and of the gasket 7, to provide a circumferential bare area for electric resistance welding of the parts together.

Figure 3:
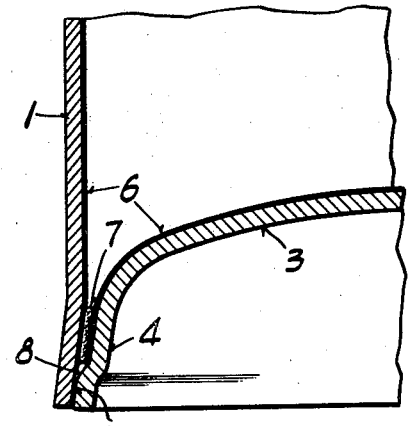
Fig. 3 is a similar section through the assembled parts just prior to welding.

According to the present invention at least one of the members, the head or the shell or both, has its bare end edge portion offset toward the other member. In the drawing the bare edge portion 8 of flange 4 is offset outwardly toward the bare edge portion 9 of the shell 1. The amount of offset is preferably slightly less than the total thickness of the two overlapping linings 6 and the gasket 7 so that when the parts are assembled as shown in Fig. 3 there is a small radial clearance between the edge portions 8 and 9.

In welding the parts together it is possible to employ a welder comprised of two opposed electrode rolls one engaging the inside back of edge portion 8 of flange 4 and the other engaging the outside back of edge portion 9 of shell 1 under pressure to bring the parts together and heat the same by flowing heating current therethrough, the welding being progressive about the circumference of the members as the latter are passed through between the rollers.

However, it is preferable to counteract the undesirable contraction of the parts at the weld by employing a ring electrode 10 fitting tightly inside the edge portion 8 of flange 4 while applying a roller electrode 11 to the outside of edge portion 9 of shell 1. In this way the shell is forced inwardly against flange 4 during welding and tends to spring back, partially compensating for the thermal contraction occurring after welding. In addition the electrode 10 prevents contraction of the flange 4 during cooling from the welding operation, it being desirable not to remove the electrode 10 until the parts have cooled a substantial amount.

The welding electrodes 10 and 11 are connected through transformer 12 to a source 13 of electric energy. Electrode pressure is applied either mechanically or hydraulically by any suitable means, not shown, the drawing having arrows to indicate the pressure of the electrodes toward each other.

The squeezing of gasket 7 when the clearance between edge portions 8 and 9 is taken up in the welding operation more effectively seals the parts together adjacent the weld and prevents circulation of the contents of the tank against the bare metal at the weld.

Various embodiments of the invention may be employed within the scope of the accompanying claims.

I claim:

1. A welded tank comprising a cylindrical shell and an end head therefor, said end head having a peripheral flange directed outwardly and fitting within the end of the shell, non-metallic sealing means of substantial thickness disposed between the head flange and shell and leaving a corresponding edge portion of each exposed for welding, means disposed to substantially reduce the gap between said edge portions, and an electric resistance line weld joining said edge portions throughout the circumference thereof.

2. A welded tank comprising a cylindrical shell and an end head therefor, said end head having a peripheral flange directed outwardly and fitting within the end of the shell, non-metallic sealing means of substantial thickness disposed between the head flange and shell and leaving an edge portion of each exposed and faced toward each other for welding together under pressure and flow of heating current therethrough, at least one of said edge portions being offset toward the other a distance slightly less than the normal thickness of said sealing means, and an electric resistance line weld joining said edge portions throughout the circumference thereof and effecting squeezing of said sealing means under a radial pressure.

3. A welded tank comprising a cylindrical shell and an end head therefor, said end head having a peripheral flange directed outwardly and fitting within the end of the shell, non-metallic sealing means of substantial thickness disposed between the head flange and shell and leaving an edge portion of each exposed and faced toward each other for welding together under pressure and flow of heating current therethrough, the edge portion of said head flange being radially offset outwardly toward the corresponding edge portion of the shell, and an electric resistance line weld joining said edge portions throughout the circumference thereof.

4. A welded tank comprising a cylindrical shell and an end head therefor, said end head having a peripheral flange directed outwardly and fitting within the end of the shell, non-metallic sealing means of substantial thickness disposed between the head flange and shell and leaving an edge portion of each exposed and faced toward each other for welding together under pressure and flow of heating current therethrough, the edge portions of said head flange being radially offset outwardly toward the corresponding edge portion of the shell a distance slightly less than the normal thickness of said sealing means, and an electric resistance line weld joining said edge portions throughout the circumference thereof and effecting squeezing of said sealing means under a radial pressure.

5. A welded tank comprising a cylindrical shell and an end head therefor, said end head having a peripheral flange directed outwardly and fitting within the end of the shell, a ceramic enamel lining for said head and shell and extending over overlapping portions of said flange and shell and leaving a corresponding longitudinally overlapping edge portion of each bare for welding, and an electric resistance line weld joining said edge portions throughout the circumference thereof.

WESLEY G. MARTIN.

REFERENCES CITED

The following references are of record in the file of this patent:

UNITED STATES PATENTS

| Number | Name | Date |
|---|---|---|
| 1,020,056 | Rietzel | Mar. 12, 1912 |
| 1,754,051 | Rosenberg | Apr. 8, 1930 |
| 2,263,021 | Uecker | Nov. 18, 1941 |

OTHER REFERENCES

Welding Handbook, page 352, 1942.